United States Patent Office 2,744,866
Patented May 8, 1956

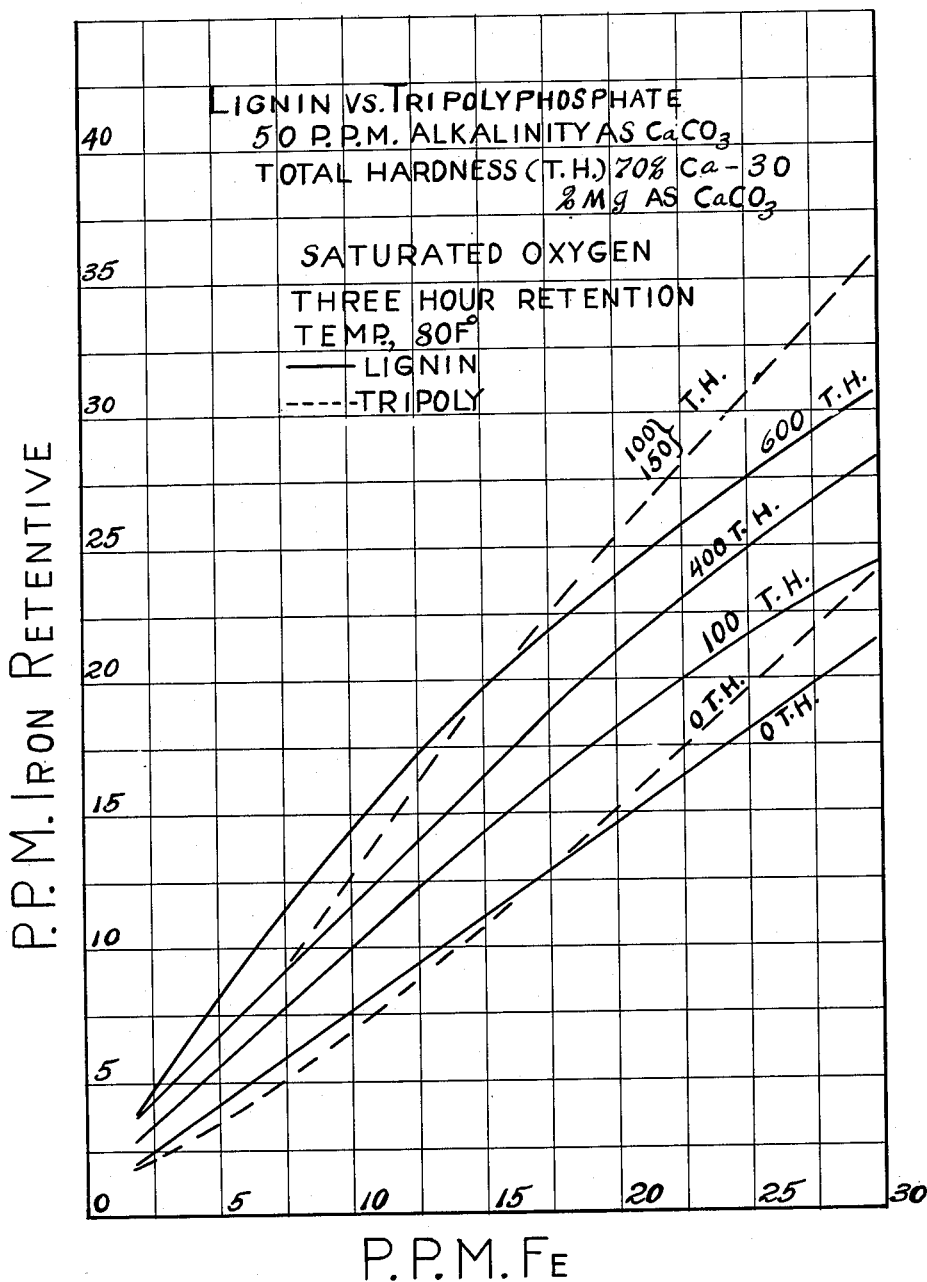

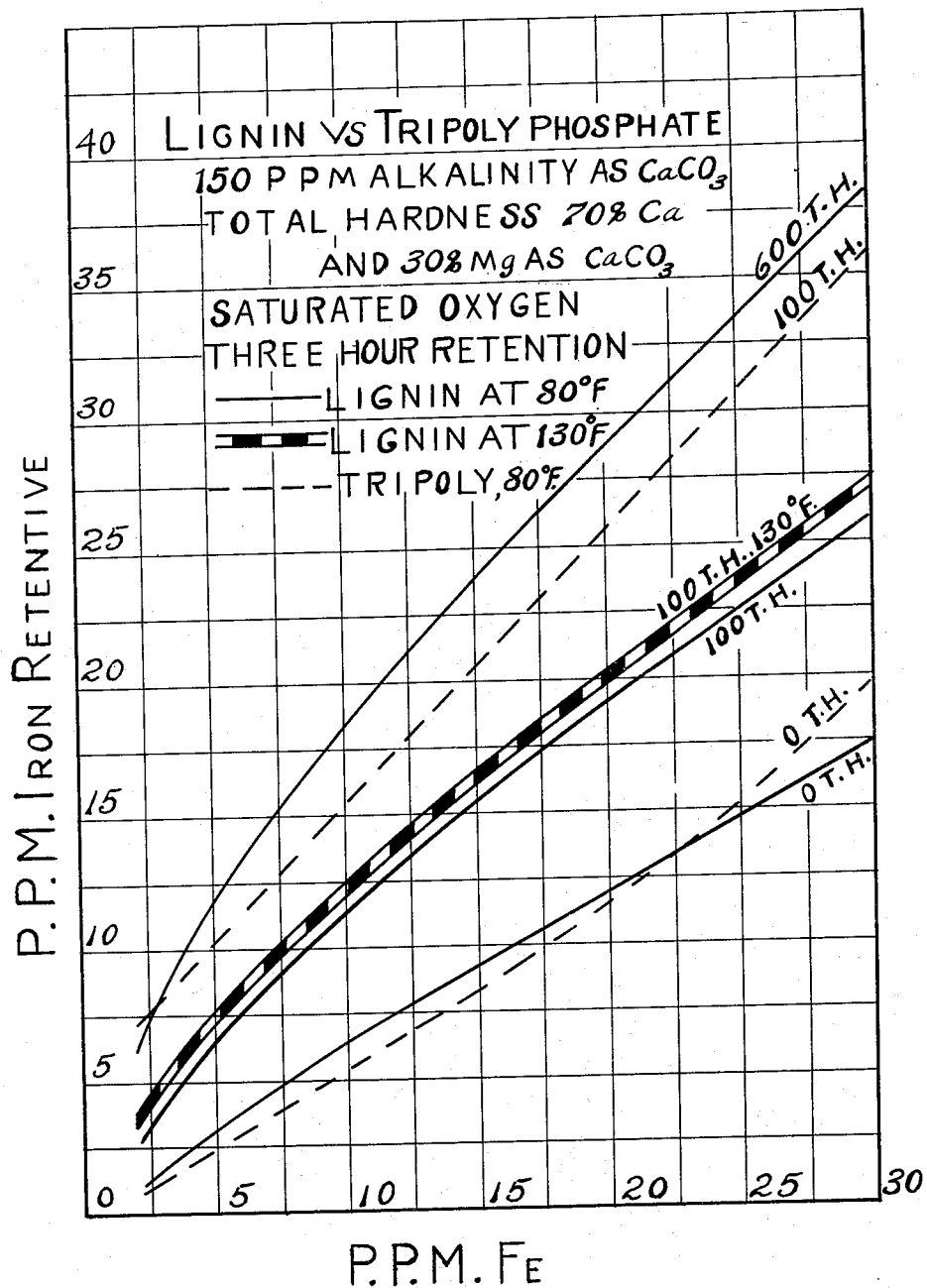

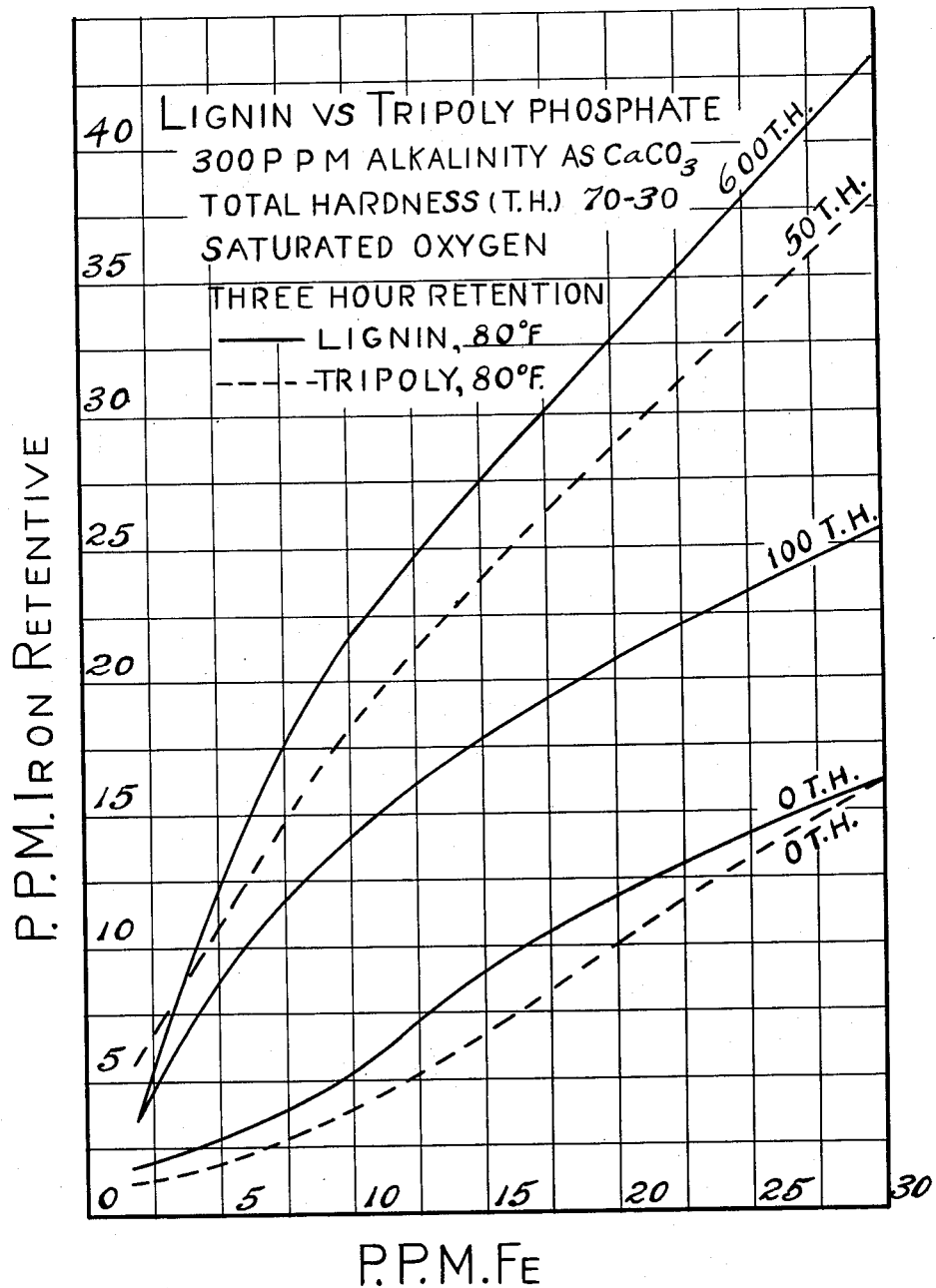

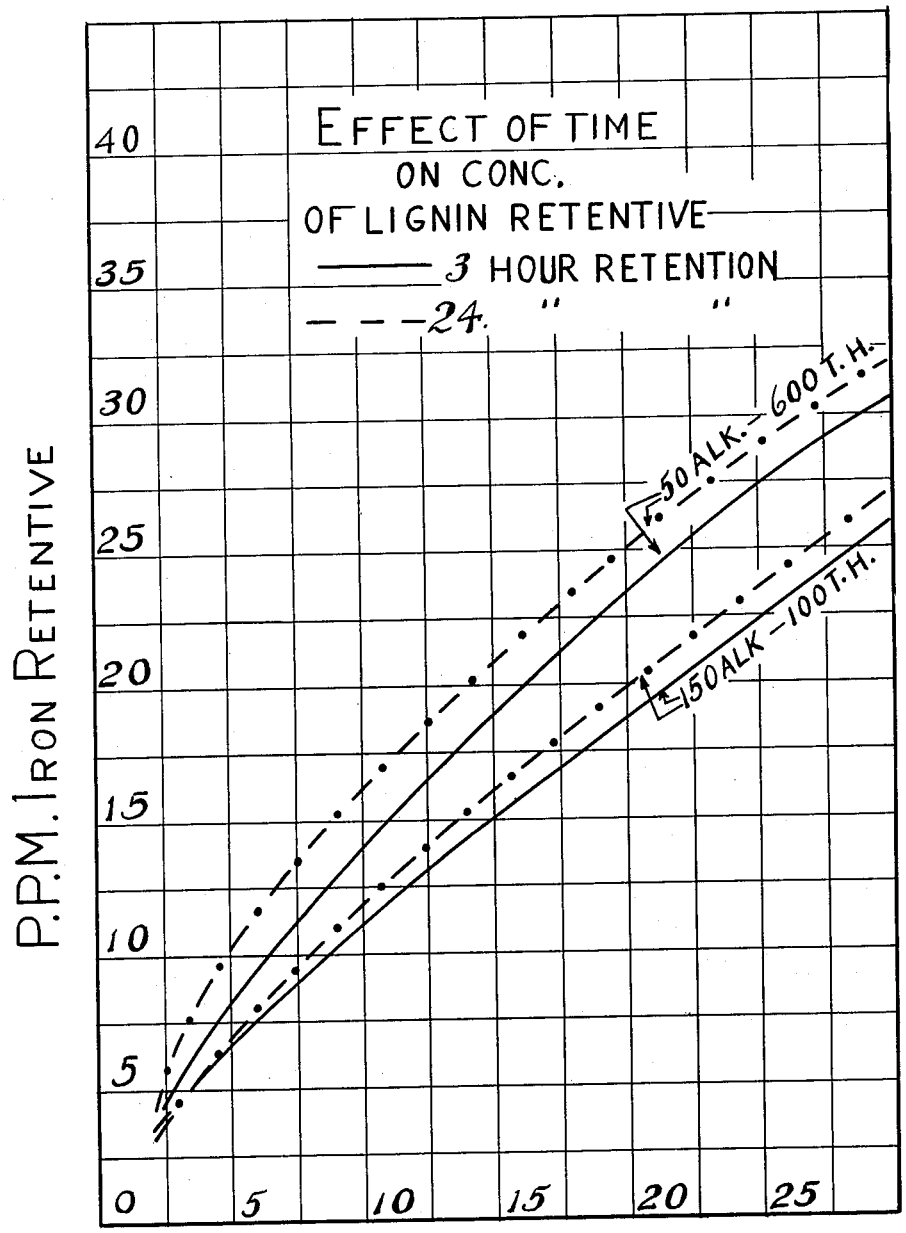

2,744,866

IRON RETENTION IN AQUEOUS SOLUTION

Harry Lewis Kahler, Feasterville, Pa., assignor to W. H. & L. D. Betz, Philadelphia, Pa., a partnership composed of William H. Betz, L. Drew Betz, and John Drew Betz Application March 25, 1952, Serial No. 278,359

4 Claims. (Cl. 210—23)

The present invention relates to processes of treating water supplies to retain iron in solution and to such treated water supplies.

A purpose of the present invention is to retard the precipitation of dissolved iron from water supplies especially those drawn from wells.

A further purpose is to reduce the cost and simplify the treatment required to make iron in domestic and industrial water supplies, especially those from well sources, stay in solution.

A further purpose is to retard or prevent the tendency to deposit iron from water drawn from wells when such water comes in contact with air and changes its pH due to evolution of carbon dioxide.

A further purpose is to render water treated with lignin more stable to temperature changes.

A further purpose is to prolong iron retention beyond that possible from treatments of water supplies in the prior art.

A further purpose is to reduce the effect of calcium and magnesium on the required concentration of iron retentives.

A further purpose is to introduce water soluble lignin to a water supply containing iron before the water supply is exposed to air or oxygen. The lignin may be used suitably in any desired proportion, preferably in the range in 0.2 to 200 p. p. m. and most desirably in the range from 0.2 to 40 p. p. m.

A further purpose is to exclude air from contact with the water supply subsequent to the addition of water soluble lignin thereto.

A further purpose is to avoid precipitation of a compound formed by the iron retentive.

Further purposes appear in the specification and in the claims.

The drawings show curves useful in explaining the invention. The drawings plot parts per million of the iron retentive of the invention, in some cases compared with another iron retentive as ordinate and parts per million of dissolved iron in the water supply which is retained as abscissae.

As natural water flows in contact with rocks and with the earth, it dissolves iron. Surface waters ordinarily do not contain more than one p. p. m. of iron and most of them contain less than 0.1 p. p. m. of iron (Geological Survey, Water Supply Paper 658, page 6). Many ground waters, on the other hand, contain several p. p. m. of iron. Well waters vary in their iron content depending upon the character of the soil, and in isolated instances well waters have been found containing up to 100 p. p. m. of iron. In addition to these natural sources of iron, water is likely to pick up iron from steel tanks and piping.

Water that contains much iron is objectionable from the standpoint of industrial applications. The iron becomes insoluble after the water is exposed to air and the water stains porcelain and enamelled ware and fixtures, and clothing and other fabrics. Iron is also objectionable in dyeing, because of the tendency to cause streaks and for other reasons. In many other industries such as tanning and paper, iron in industrial water supplies is objectionable. In cooling water, iron tends to form a heat insulating deposit on the piping, interfering with efficiency of heat exchange and requiring periodic cleaning.

The United States Public Health Service recommends that a limit of 0.3 p. p. m. on total iron plus manganese be placed on drinking water. U. S. Public Health Service Drinking Water Standards (1946) 30 J. A. W. A. 361, 370 (March 1946).

For this and other reasons, iron presents a problem to most users of water. There are several ways of solving the iron problem in water supplies. In one procedure it is removed by aeration and filtration. If the iron is not accompanied by manganese, this removal is easy, necessitating only thorough aeration and sufficient time for coagulation and settling. Nelson in U. S. Patent No. 2,269,315 describes a special filter bed for removal of iron. This bed is composed of lignin extracted from corn cobs and other farm waste, which unites with the iron as the water flows through the bed, and removes the iron in this way. The effluent from the bed is practically iron free as the iron is deposited on the bed. If manganese accompanies the iron, special precautions are required.

Where the water is softened to remove calcium and magnesium for other purposes, iron and manganese are removed in the softening and filtering operations.

There is another different approach to the iron problem. This involves adding to the water supply before the water has become aerated, a compound which retains the iron in solution or dispersion and is designated herein as an iron retentive. Based upon experimental work up to the present time, it is not possible to determine whether iron retentives act by holding the iron in solution or in dispersion. There is often an opalescence developed, but without formation of any distinct particle size, and it is believed that a part of the iron is retained as a positively charged ferric hydroxide hydrosol which is, of course colloidal. 2 Alexander, Colloid Chemistry (1928) 226.

Rice in U. S. Patent 2,304,850 has shown that molecularly dehydrated phosphates have the power of keeping iron dispersed where a minimum iron-phosphate weight ratio of 1 to 1 is observed. The use of molecularly dehydrated phosphates as iron retentives has definite advantages over softening or filtering with or without the use of a lignin bed from the standpoint of simplicity, economy and saving of time.

The use of molecularly dehydrated phosphates as iron retentives is limited by the concentration of calcium and by the pH at a given temperature. As the temperature rises more phosphate is required to retain the same concentration of iron. In the case of waters having considerable hardness the use of molecularly dehydrated phosphates has little or no application unless the pH is adjusted downwards to avoid the precipitation of calcium phosphate, or unless considerably higher concentrations of phosphates are employed to sequester calcium and magnesium in addition to iron.

In research to uncover other materials which are more effective as iron retentives than the phosphates, I have discovered that water soluble lignins have remarkable power to overcome the difficulties due to precipitation of iron.

Lignin may be defined as that part of woody material such as wood, straw, corn cobs and the like which remains as an insoluble product when such woody material is treated with mineral acids (Ott, Cellulose and Cellulose Derivatives (Interscience Publishers, New York 1946) 449).

One procedure for preparing lignin is to boil a substance such as corn cobs, wood or straw with alkali, filter and then acidify with acid. The resultant lignin is water insoluble, and is filtered, washed and dried. Lignin of this character is capable of removing iron from solution and depositing it on a filter bed.

There is a wholly different character of lignin, however, which is water soluble, with which the present invention is concerned. Water soluble lignin may be obtained in various ways. When I refer herein to water soluble lignin, it will be understood that the structures of many of these compounds are not thoroughly understood, and the material which I am designating may more properly be described as a water soluble lignin derivative. The sulphite process of pulp making produces lignosulphonates which are water soluble. Very effective iron retention is possessed by water soluble calcium, magnesium and sodium salts of lignosulphonates. They may be employed in partially or wholly sulphonated or in partially or wholly sulphonated or in partially desulphonated or wholly desulphonated forms.

Water soluble lignins are also obtained by boiling lignin in caustic alkali, by treating lignin with chlorine according to the Devains and Pomilio (same as Cataldi) process, by treating lignin with caustic alkali plus chlorine, or by treating lignin with nitric acid followed by caustic alkali.

All of these processes of producing soluble lignin are well known in the art and the following references are given on production of water soluble lignin:

Erwin A. Pearl, Utilization of Sulphite Waste Liquor, 26 Chemical and Engineering News 2950 (October 4, 1948). Ott, Cellulose and Cellulose Derivatives, 449. Wise, Wood Chemistry, Chapter 10. Marathon Chemical Company, Rothschild, Wisconsin, Marathon Lignin Sulphite Bulletin, B. A. 141.

Water soluble lignins are remarkable in their property of iron retention, and they exhibit this property to such an extent that their utilization is more economical than the phosphates in many ranges of iron and calcium, they are less critical as to temperature changes, and they give much more prolonged iron retention. The lignin treatment is furthermore effective under greater changes in pH due to evolution of carbon dioxide from the water supply than in the case of the molecularly dehydrated phosphates.

In the tests discussed below, a thermostatically controlled water bath containing twelve 2 liter flasks was used, the flasks being equipped with water condensers and air inlets. The tests were mainly run for three hours which is equivalent to the time the water is in use in most industrial water supplies where the water is passed through the system only once. The tests were carried out by placing the desired ions in solution in addition to a freshly made ferrous iron solution in the flask, admitting air continuously and determining how long the iron was retained in dispersion before it coagulated.

Where no iron retentive is used, the rapidity of iron precipitation in an aerated system at room temperature depends on the pH and the concentrations of iron and alkalinity. The precipitation takes place in a few minutes with 30 p. p. m. Fe, alkalinity of 300 p. p. m. as calcium carbonate and pH 8.0. For low iron concentrations, alkalinity and pH, the time of precipitation is increased, reaching 15 minutes for 2 p. p. m. iron, 50 p. p. m. alkalinity and a pH of 7.4. Where retentives were employed, the time of retention after air admission was prolonged, although it is contemplated according to the present invention that the water supply will be protected from contact with air for as long a time as possible after introduction of the iron retentive in order to increase the effectiveness.

Figures 1 to 4 are graphs showing results obtained under various conditions.

Figure 1 shows as ordinates the p. p. m. of lignin on the curves having solid lines, and the p. p. m. of sodium tripolyphosphate on the dotted curves, required to retain iron in solution for three hours with concentrations of total hardness (T. H.) varying from 0 to 600 p. p. m., with an alkalinity as calcium carbonate titrated using methyl orange indicator of 50 p. p. m.

Check tests were run comparing sodium tripolyphosphate with sodium hexametaphosphate, sodium tetraphosphate and sodium decaphosphate and all of these compounds were found to be substantially identical in iron retentive property so that sodium tripolyphosphate can be considered to be representative of the general group of molecularly dehydrated phosphates having weight ratios of $Na_2O$ to $P_2O_5$ between 1 to 1 and 2 to 1.

In the lower pair of curves for "zero" total hardness shown in Figure 1, the lignin and sodium tripolyphosphate were found to be substantially equivalent in iron retentive power.

At all hardness levels above "zero" the lignin was far superior to the sodium tripolyphosphate, lignin being substantially as effective at a total hardness of 600 p. p. m. as sodium tripolyphosphate was at total hardness of 100 and 150 p. p. m. In fact, although the lignin concentration must be increased slightly as the total hardness rises, even at total hardnesses as high as 600 p. p. m. the lignin requirements were relatively low.

For an alkalinity titrated with methyl orange of 50 p. p. m., the phosphate treatment was not practical above a total hardness of 150 p. p. m. as calcium phosphate precipitated. The lignin treatment avoids this difficulty which is present with the phosphate treatment.

At all total hardness levels where both the lignin and the sodium tripolyphosphate treatments were usable, the lignin treatment was superior to the sodium tripolyphosphate, lowering the quantity of iron retentive required by as much as 46 percent in iron concentration ranges of 30 p. p. m. and by 30 percent in iron concentration ranges of 10 p. p. m. Both treatments allowed the iron to oxidize to what is believed to be the positively charged ferric hydroxide hydrosol, which had the characteristic yellow or orange red color depending on its concentration.

All the results shown on Figure 1 are taken under temperatures of 80° F.

Figure 2 shows results at 80° F. using 150 p. p. m. alkalinity as calcium carbonate. At "zero" total hardness the water soluble lignin and sodium tripolyphosphate were equally effective as retentives. At 100 p. p. m. total hardness, less water soluble lignin was required than sodium tripolyphosphate to retain the iron. At 600 p. p. m. total hardness, the lignin required for iron retention was hardly more than the sodium tripolyphosphate required for the same iron content at 100 p. p. m. total hardness. All of these results were obtained at 80° F. They show that lignin was less susceptible to the effect of calcium and magnesium than sodium tripolyphosphate.

Figure 2 also shows the results obtained using water soluble lignin at 130° F. Substantially the same amount of water soluble lignin was required to hold the iron in solution at 130° F. as at 80° F., so that the quantity of water soluble lignin within this temperature range is substantially independent of temperature.

It was found that at 10 p. p. m. iron in solution and 100 p. p. m. total hardness, 18 p. p. m. of water soluble lignin retentive kept the iron from coming down up to boiling temperatures. Some calcium carbonate and magnesium hydroxide precipitated, but on standing and cooling for 20 hours, the iron was retained in the water supply, which shows the power of the lignin retentive. The effect of temperature is important since water supplies treated in accordance with the invention are desirable for cooling purposes where a temperature increment would be encountered. The lignin retentive need not be increased to take care of the effect of increased temperature.

Experiments conducted with sodium tripolyphosphate established that it is highly susceptible to increase in temperature, as calcium phosphate precipitates at an alkalinity of 150 p. p. m. (at a pH of 7.8) at hardnesses above 25 p. p. m. as calcium carbonate, rendering the use of sodium tripolyphosphate impractical under such conditions.

Figure 3 shows the results for higher alkalinity, in this case 300 p. p. m. of alkalinity as calcium carbonate. The sodium tripolyphosphate still is much less efficient except at "zero" total hardness. At this increased alkalinity in the presence of calcium and magnesium ions more sodium tripolyphosphate retentive was required than water soluble lignin per p. p. m. of iron. At 50 p. p. m. total hardness and 80° F. it required almost as much sodium tripolyphosphate as was required of water soluble lignin at 600 p. p. m. total hardness. Of course it will be evident that sodium tripolyphosphate could not be used above 50 p. p. m. total hardness due to precipitation of calcium and magnesium phosphates.

At the higher temperature of 130° F. sodium tripolyphosphate was useful only when the total hardness was below 17 p. p. m. as calcium carbonate, since above this level calcium and magnesium phosphate precipitated. This feature of avoiding difficulty at higher ranges of total hardness is a great advantage of the present invention as compared with molecularly dehydrated phosphate retentive treatment.

Figure 4 shows the effect of time of retention on the required percentage of retentive. One set of curves is for 3 hours retention and the other set of curves is for 24 hours retention, in one case with 150 p. p. m. alkalinity as calcium carbonate and 100 p. p. m. total hardness and in another case with 50 p. p. m. alkalinity and 600 p. p. m. total hardness. For all practical purposes the same concentration of water soluble lignin was effective for 3 hours and for 24 hours. In some of the individual tests in this series the iron was retained in the presence of oxygen for 67 hours.

In some water systems air does not have a chance to get into the water before the water is put to the intended use. In systems of this character there is a problem of iron precipitation even though the iron does not have a chance to oxidize from the ferrous to the ferric state. Under systems such as these there is usually a vent for carbon dioxide, and when carbon dioxide is vented there is a rise in pH of the water supply. If the rise in pH is sufficient the iron will precipitate in the ferrous condition as an insoluble oxide, hydroxide or mixture of oxides and hydroxides of iron. In a system such as this, the lignin retentive has been found to retain the iron in solution notwithstanding the venting of carbon dioxide. Under these conditions the lignin retentive is more powerful than under conditions in which the iron is present as ferric hydroxide hydrosol.

It will be evident that the exclusion of air makes the lignin retentive more effective, and therefore when this can be done it is desirable to employ water soluble lignin in the water supply and place the water supply in tanks and piping which exclude air for as long as possible and preferably to the point of use. However, it will be evident that the invention is operative also under the more severe conditions in which the water supply takes on air or is even violently agitated with air during the period in which iron must be retained.

The above results are obtainable with any of the water soluble lignins, all of which have superlative power to retain iron in water solution by adding them to the water supply before the water has a chance to contact the air.

Best results are obtained with water soluble lignosulphonates, whether fully sulphonated, partially sulphonated, or desulphonated after sulphonation, as well known in the art. The above results in the curves have been obtained using a lignosulphonate having a sulphur to lignin ratio of approximately 32 to 440. The building unit in the lignosulphonic acids is generally considered to consist of 5 benzene rings with propane side chains, 1 methoxyl group per monomer, 1 sulphonic group for every 2 to 5 monomers and 1 phenolic group for every 5 to 6 monomers. There is uncertainty as to whether the monomers are combined through an ether linkage, a pyron ring linkage or a furan ring linkage. It is not known whether the polymerization is in a straight line or whether there is a branching or both, and depending on which occurs the molecular weight may vary from about a thousand to 20,000.

In other group of experiments with lignosulphonates, the sulphur to lignin ratio was 32 to 2500 due to desulphonation.

The most effective lignosulphonates are calcium lignosulphonate, magnesium lignosulphonate and sodium lignosulphonate. These compounds will of course result where an acidic lignosulphonate is brought into contact with a water supply containing calcium, magnesium and sodium.

Various factors determine the amount of water soluble lignin required. It is of course a function of the content of soluble iron in the water supply. It is also a function of the content of other constituents in the water supply, such as calcium, magnesium, alkalinity to methyl orange, and also of pH.

My experiments indicate that anions such as sulphate, chloride and nitrate do not have any great effect on the water soluble lignin retentive concentrations required.

The amount of water soluble lignin retentive required is only slightly influenced by the time of iron retention up to 24 hours, although slightly less is required for 3 hours than for 24 hours.

I have determined the concentrations of water soluble lignin required for 3 hour retention under various sets of conditions including aeration, temperature, iron concentration, calcium concentration, magnesium concentration, alkalinity to methyl orange and pH. An example will illustrate the manner in which water soluble lignins of the invention are employed.

Let us consider a well water supply at 50° F., unaerated, containing 10 p. p. m. iron, 100 p. p. m. total hardness as calcium carbonate, 45 p. p. m. of alkalinity as calcium carbonate, 96 p. p. m. of sulphate, 150 p. p. m. of chloride and a pH of 7.2. The amount of water soluble lignin needed to keep iron retained in solution or dispersion while water is in use is determined from Figure 1. The curve for 100 p. p. m. total hardness shows that a 10 p. p. m. iron retention for 3 hours was accomplished by 10 p. p. m. water soluble lignin which was slightly less than 0.1 pound retentive per 1000 gallons of water used.

To be used properly, the retentive must be injected into the water before the water has a chance to aerate. Failure to do this offsets to a great degree the advantage of the retentive unless the system is of the type which has no oxygen leakage. After the lignin is introduced, the water can be fully aerated without harm.

The retentive should be continuously used for best results. Discontinuance of feed will cause precipitation of the iron while no treatment is reaching the system.

One of the great advantages of the lignin treatment is that the water with which it is treated can be heated to 130 to 150° F. or higher or used in a heat exchanger for cooling purposes without the iron being precipitated.

Most other iron retentive treatments require more treatment in order to tolerate higher temperatures. The water soluble lignin retentives although brown in color add very little color at the concentrations used in this research to the aerated water in which the iron is retained. The iron imparts a straw color which is perceptible above 2 p. p. m. iron. As the iron content increases toward 30 p. p. m. it imparts a strong yellow or orange color. The iron retentive does not eliminate the iron color although larger amounts of retentive reduce the iron color somewhat. In most cases the retentives are unable to prevent the oxidation of the iron from the ferrous to the ferric state. When the ferric state is reached, the iron forms the colored colloidal ferric hydroxide hydrosol.

Ordinarily the water soluble lignin will be added in proportions between 0.2 and 40 p. p. m. although in extreme cases it may be desirable to add as much as 200 p. p. m. of water soluble lignin. Higher quantities of lignin are not recommended although they can be used, although wastefully.

For determining the quantities of water soluble lignin required for other samples, it is merely necessary to know the chemical analysis of the water supply and the amount of retentive can be determined from the curves. For retention over reasonable periods beyond 24 hours it is merely necessary to add slight increments to those shown by the curve to allow for the additional time of retention, up to periods of several days.

While the invention is believed to have its widest application in the treatment of industrial water supplies for heat exchangers, and process applications, it may in individual cases be applicable also to domestic water supplies and other applications where water is employed in bulk, as for example to prevent precipitation of iron or staining or the like due to removal of iron from solution.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. The process of treating a water supply from a well preparatory to use in a non-evaporative water-using device, which water supply contains a substantial amount of iron in solution, has an alkalinity as calcium carbonate between 0 and 300 p. p. m., and is nonaerated, which comprises adding a water soluble lignin to the water supply, said lignin being added to said water supply between its source and said water-using device, said water soluble lignin being added in a concentration of from 0.2 to 200 p. p. m.

2. The process according to claim 1, in which said concentration of water soluble lignin is between 0.2 and 40 p. p. m.

3. The process according to claim 1, in which the lignin is water soluble ligno sulphonate.

4. The process according to claim 2, in which the lignin is water soluble ligno sulphonate.

References Cited in the file of this patent

UNITED STATES PATENTS

| Number | Name | Date |
|---|---|---|
| 144,737 | Burgess | Nov. 18, 1873 |
| 2,269,315 | Nelson et al. | Jan. 6, 1942 |
| 2,304,850 | Rice | Dec. 15, 1942 |
| 2,318,663 | Bird et al. | May 11, 1943 |
| 2,505,457 | Bird | Apr. 25, 1950 |
| 2,576,386 | Bird | Nov. 27, 1951 |

OTHER REFERENCES

Lange's Handbook of Chem., 7th ed., p. 783, 1949.